US 12,446,539 B2

(12) United States Patent
Gong et al.

(10) Patent No.: US 12,446,539 B2
(45) Date of Patent: Oct. 21, 2025

(54) FULL-AUTOMATIC CAT TOILET

(71) Applicant: JIANGSU ERLANGSHEN PLASTIC CO., LTD., Yangzhou (CN)

(72) Inventors: Yuan Gong, Yangzhou (CN); Kang Zhao, Yangzhou (CN); Keyong Xiao, Yangzhou (CN)

(*) Notice: Subject to any disclaimer, the term of this patent is extended or adjusted under 35 U.S.C. 154(b) by 0 days.

(21) Appl. No.: 18/809,397

(22) Filed: Aug. 20, 2024

(65) Prior Publication Data

US 2024/0407322 A1 Dec. 12, 2024

Related U.S. Application Data

(63) Continuation of application No. 17/553,693, filed on Dec. 16, 2021, now abandoned.

(51) Int. Cl.
*A01K 1/01* (2006.01)
(52) U.S. Cl.
CPC .................. *A01K 1/0114* (2013.01)
(58) Field of Classification Search
CPC .................. A01K 1/0114; A01K 1/011
See application file for complete search history.

(56) References Cited

U.S. PATENT DOCUMENTS

| | | | | |
|---|---|---|---|---|
| 4,061,111 A | * | 12/1977 | Smith | A01K 13/001 119/672 |
| 11,412,704 B2 | * | 8/2022 | Noh | A01K 1/011 |
| 2002/0139312 A1 | * | 10/2002 | Reitz | A01K 1/0114 119/165 |
| 2015/0143750 A1 | * | 5/2015 | Jalbert | A01K 5/025 49/25 |
| 2018/0077896 A1 | * | 3/2018 | Couto | A01K 1/0114 |

FOREIGN PATENT DOCUMENTS

| | | | |
|---|---|---|---|
| CN | 203952059 U | 11/2014 | |
| CN | 105145379 A | 12/2015 | |
| CN | 206932924 U | 1/2018 | |
| CN | 208159685 U | 11/2018 | |
| KR | 101903677 B1 * | 10/2018 | ............ A01K 1/011 |
| WO | WO-2011057379 A1 * | 5/2011 | ............ A01K 1/0114 |

* cited by examiner

*Primary Examiner* — Christopher D Hutchens
*Assistant Examiner* — Nevena Aleksic
(74) *Attorney, Agent, or Firm* — Hemisphere Law, PLLC; Zhigang Ma

(57) ABSTRACT

A full-automatic cat toilet is provided, which includes: a base; an accommodating cavity arranged in the base for placing cat litter; and a rotating shovel; wherein the rotating shovel has two ends rotatably arranged on the base, and a rotating shovel claw arranged at a radial end thereof; the rotating shovel and the rotating shovel claw are capable of rotating so as to unload the cat litter into the accommodating cavity, the accommodating cavity is located below the rotating shovel and the rotating shovel claw.

7 Claims, 8 Drawing Sheets

FULL-AUTOMATIC CAT TOILET

CROSS REFERENCE TO RELATED APPLICATIONS

This application is a continuation of U.S. patent application Ser. No. 17/553,693, filed on Dec. 16, 2021, which is a continuation of International Patent Application No. PCT/CN2020/097034 with a filing date of Jun. 19, 2020, designating the United States, claiming priority to Chinese Patent Application No. 201910534427.2 with a filing date of Jun. 20, 2019. The content of the aforementioned applications, including any intervening amendments thereto, are incorporated herein by reference.

TECHNICAL FIELD

The present disclosure relates to a cat toilet which belongs to the technical field of pet equipment.

BACKGROUND

A Chinese patent disclosure with publication number CN10591814A and publication date on Sep. 7, 2016 discloses a smart cat litter box, which includes a basin body provided with an accommodating cavity for placing cat litter, a first driving unit, a combing rake and a conveying frame; the combing rake is fixed on the conveying frame, the first driving unit drives the conveying frame; a movement stroke of the combing rake is directed from a first end of the accommodating cavity to a second end of the accommodating cavity; and the first end and the second end are opposite ends of the accommodating cavity; a excrement outlet is provided on the basin body, and the excrement outlet is located at the second end; the smart cat litter box further includes a processor that controls the first driving unit. The basin body is provided with a packing assembly, which includes a fixing mechanism, a movable mechanism and a second driving unit; and the packing assembly is used for automatically packing a excrement collection bag. The cat litter box adopting the above structure needs to drive the combing rake through the first driving unit, and the combing rake combs the cat litter, so as to discharge the excrement in the cat litter from the excrement outlet, and the packing assembly packs the excrement that falls into the excrement outlet. In other words, the combing rake and the packaging assembly are independent structures including many parts. The product is complex and difficult to process and manufacture, and has a short service life.

SUMMARY

The purpose of the present disclosure is to provide a full-automatic cat toilet. The structures for collecting and removing cat litter blocks are combined to form an integrated structure, which is ingenious, easy to use and small in size and has fewer parts and low production cost.

The purpose of the present disclosure is achieved through the following technical solutions, a full-automatic cat toilet, comprising an accommodating cavity arranged in the base for placing cat litter; and a rotating shovel; wherein two ends of the rotating shovel are rotatably arranged in the base; a rotating shovel claw is arranged at a radial end of the rotating shovel; the rotating shovel and the rotating shovel claw are capable of turning over with respect to the accommodating cavity and the base; a turning movement stroke of the rotating shovel and rotating shovel claw is between position A and position B; wherein the position A is located in a rear bottom area of the base, and the position B is located in a rear top area of the base; the accommodating cavity is located below the rotating shovel and the rotating shovel claw; and the accommodating cavity has a space that satisfies the turning movement stroke of the rotating shovel and the rotating shovel claw; through a turning movement of the rotating shovel and the rotating shovel claw, a collection and removal of cat litter blocks in the accommodating cavity are realized.

Preferably, the full-automatic cat toilet further comprises a rotating shovel driving component; wherein the rotating shovel driving component comprises a first motor installed on the base; the first motor is connected to an end of the rotating shovel, and the first motor is a positive and negative rotating motor.

Preferably, the full-automatic cat toilet further comprises a rotating shovel driving component; wherein the rotating shovel driving component comprises a first motor and a second motor; the first and second motors are symmetrically arranged on the base, and the first motor is drivingly connected to an end of the rotating shovel, the second motor is drivingly connected to the other end of the rotating shovel; the first and second motors are both positive and negative rotating motors, and the second motor rotates synchronously with the first motor.

Preferably, the base is provided with a cover; the base and the cover form a cat toilet housing; the cat toilet housing is provided with a door hole, and a door frame is arranged in the door hole; the door frame is connected to a door through a pivot, and a door motor drivingly connected to the pivot; two sides of the pivot are respectively provided with a first limit switch and a second limit switch; when the door rotates to the first limit switch, the door is opened to a maximum angle; when the door rotates to the second limit switch, the door is closed.

Preferably, the full-automatic cat toilet further comprises a removable rubbish box configured to receive the cat litter blocks in the rotating shovel claw, when the rotating shovel and the rotating shovel claw reaches the position B, the cat litter blocks collected by the rotating shovel claw enter the rubbish box. A rubbish box base configured to place the rubbish box; the removable rubbish box is provided with a rubbish box cover.

Preferably, a first limiting mechanism is provided on the base, and the first limiting mechanism is configured to limit the accommodating cavity to moving left and right; and a second limiting mechanism is provided on the base, the second limiting mechanism is configured to limit the accommodating cavity to moving up and down.

Preferably, a sliding base and a fastening mechanism are provided on the base, the sliding base is a drawer-type structure, the sliding base is capable of moving horizontally with respect to the base, the sliding base is capable of being hidden in the base, and the sliding base is capable of being slid out of the base; a top surface of the sliding base is provided with a pedal, and the pedal is set horizontally; the base is provided with a fastening mechanism configured to control the sliding base to pull out and pull back.

Preferably, the full-automatic cat toilet further comprises an on-off switch; when the sliding base is pulled out from the base, the sliding base is in contact with the on-off switch, and the cat toilet is powered on; when the sliding base is pulled back into the base, the sliding base is not in contact with the on-off switch, and the cat toilet is powered off.

Preferably, a bottom of the cat toilet is provided with a rotating assembly.

Preferably, the rotating shovel is provided with a notch on a side close to a center axis of the rotating shovel, and the notch is used to provide space for a cat; the rotating shovel claw is detachably installed on the rotating shovel; the rotating shovel claw comprises at least one collection claw radially arranged; an end of the at least one collection claw is a V-shaped structure; the at least one collection claw is driven to turn over by the rotating shovel, and the at least one collection claw fits an inner wall of the accommodating cavity.

Preferably, the full-automatic cat toilet further comprises:
a first photoelectric sensor switch group configured to judge whether there is a cat in the accommodating cavity;
a second photoelectric sensor switch group A configured to judge whether the rotating shovel and the rotating shovel claw have reached the position A;
a third photoelectric sensor switch group B configured to judge whether the rotating shovel and the rotating shovel claw have reached the position B;
a clock configured to judge whether it is non-working time at night;
ultraviolet lamp beads configured to sterilize the cat toilet;
a atmosphere lamp assembly configured to display a working status of the cat toilet; wherein when the rotating shovel and the rotating shovel claw are working, the atmosphere lamp assembly displays a first color; when the door is opened or closed, the atmosphere lamp assembly displays a second color; when the ultraviolet lamp beads are working, the atmosphere lamp assembly displays a third color;
a first timer configured to obtain a residence time T1 that the cat stays in the accommodating cavity;
a second timer configured to obtain a time that there is no cat in the accommodating cavity, that is, a leaving time T2;
a third timer configured to obtain a working time of the atmosphere lamp assembly; and
a fourth timer configured to obtain a running time of the ultraviolet lamp beads;
wherein the first photoelectric sensor switch group, the second photoelectric sensor switch group, the third photoelectric sensor switch group, the first timer, the second timer, the third timer, the fourth timer, the clock, the ultraviolet lamp beads, the atmosphere lamp assembly, and the rotating shovel drive component communicate with a controller respectively.

Compared with the prior art, the present disclosure has the following beneficial effects:

1) The collection device and the removal device of cat litter blocks are combined to form an integrated structure, which is designed as a rotating shovel and a rotating shovel claw. The cat litter can be collected and dumped into the rubbish box through the rotating shovel, that is, two functions can be realized by one turning action. The cat toilet is clever and easy to use.

2) By combining the collection device and the removal device of cat litter blocks into an integrated structure, the present disclosure has fewer parts and a more compact structure; in addition, the height space of the cat toilet is fully utilized by the turning motion, so that the length of the cat toilet is greatly reduced, and the footprint of the cat toilet is greatly reduced.

3) The present disclosure is provided with a retractable sliding seat. When the sliding seat is pulled out, the sliding seat triggers the physical switch of the cat toilet, so that the cat toilet changes from a standby state to a working state; in addition, when the sliding seat is pulled out, a step is formed, which is convenient for the cat entering the accommodating cavity. A fastening mechanism is set between the sliding seat and the base of the cat toilet. When the fastening mechanism is pressed down, the sliding seat can be pulled out from the base; the sliding seat is pushed back to the base after use and is locked through the fastening mechanism to prevent the sliding seat from moving out by itself.

4) The accommodating cavity of the present disclosure is located in the cat toilet, and its horizontal and vertical directions are respectively realized by corresponding limiting devices. The limiting structure in the horizontal direction can be realized by the accommodating cavity base. The accommodating cavity base matches with the accommodating cavity. The edge of the accommodating cavity is overlapped on the edge of the accommodating cavity base. A gap is left between the outer wall of the accommodating cavity and the outer wall of the accommodating cavity base. The horizontal movement of the accommodating cavity is restricted by the accommodating cavity base. Optionally, the bottom of the accommodating cavity base can be designed as a horizontal structure to ensure that the accommodating cavity base is stably placed on the cat toilet base. Optionally, an annular limit cylinder can also be arranged on the inner wall of the cat toilet base. The upper part of the annular limit cylinder is provided with an edge, the edge of the accommodating cavity overlaps the edge of the annular limit cylinder. The annular limit cylinder is slightly larger than the accommodating cavity and can limit the accommodating cavity to moving in horizontal direction. Optionally, it is also possible to provide a convex ring on the base. The convex ring is arranged horizontally, and the edge of the accommodating cavity is directly overlapped on the convex ring. The horizontal limit structures are not limited to the above structures. As long as the horizontal direction movement of the accommodating cavity can be limited by other structures, the other structures are all within the scope of the limit structure of the present disclosure.

The vertical limit of the accommodating cavity of the present disclosure can be achieved by arranging limit bars on the base, for example, a long groove is provided on the base, and a bar is arranged in the long groove. The bar is located above the edge of the accommodating cavity. The vertical limit structure is not limited to the above-mentioned structure. Any other structure that can realize the upper and lower limit of the accommodating cavity are within the scope of the limit structure of the present disclosure.

5) The movement of the rotating shovel of the present disclosure can be realized by a manual rotating structure. For example, one end of the rotating shovel is provided with a rotating handle, the other end of the rotating shovel is rotatably arranged on the side wall of the base, and the center axis of the rotating shovel is set horizontally. Optionally, both ends of the rotating shovel can be provided with rotating handles. The rotating handle can realize the turning of the rotating shovel, and realize the collection and removal of cat litter blocks.

The rotating shovel of the present disclosure can also be driven by a motor, and motor can be installed on one or both sides of the base, and the rotating shovel and the rotating shovel claw can be driven by the motor.

6) A pair of first photoelectric sensor switches are arranged on both sides of the accommodating cavity, when the photoelectric sensor switch is shielded for more than 60 seconds, it is determined that the cat enters the accommodating cavity. When the pair of first photoelectric sensor switches change from the shielded state to the non-shielded state, start timing $T_2$, when 5 minutes$\leq T_2 \leq$20 minutes, the motor is started to perform a series of actions.

The rotating shovel drive motor drives the rotating shovel swing arm to leave the starting position and make a positive rotation; when the rotating shovel swing arm triggers the end position, the third photoelectric sensor switch detects that the rotating shovel swing arm reaches position B, and the controller controls the motor to stay for two seconds, then the motor drive the rotating shovel swing arm to move in the negative direction; when the rotating shovel swing arm returns to position A, the second photoelectric sensor detects that the rotating shovel swing arm reaches position A, and the controller controls the motor to stop the movement, and the whole movement ends.

During $T_2$ time, if the first photoelectric sensor switch is shielded again, $T_2$ is counted again from the non-shielded state.

The night time period is set as sleep time, and the cat toilet stops responding during this period.

7) The housing formed by the base and the cover of the present disclosure can be a left and right separate structure, or a upper and lower separate structure. When the housing has an upper and lower separate structure, it includes a lower housing and an upper housing. The base may be a left and right separate structure or a front and rear separate structure. The upper housing may include a left and right cover structure, or a front and rear cover structure. When the housing is a left and right separate structure, it includes a left housing and a right housing. The left housing includes a left upper cover and a left base; and the right housing includes a right upper cover and a right base.

DETAILED DESCRIPTION OF PREFERRED EMBODIMENTS

Figure 1:
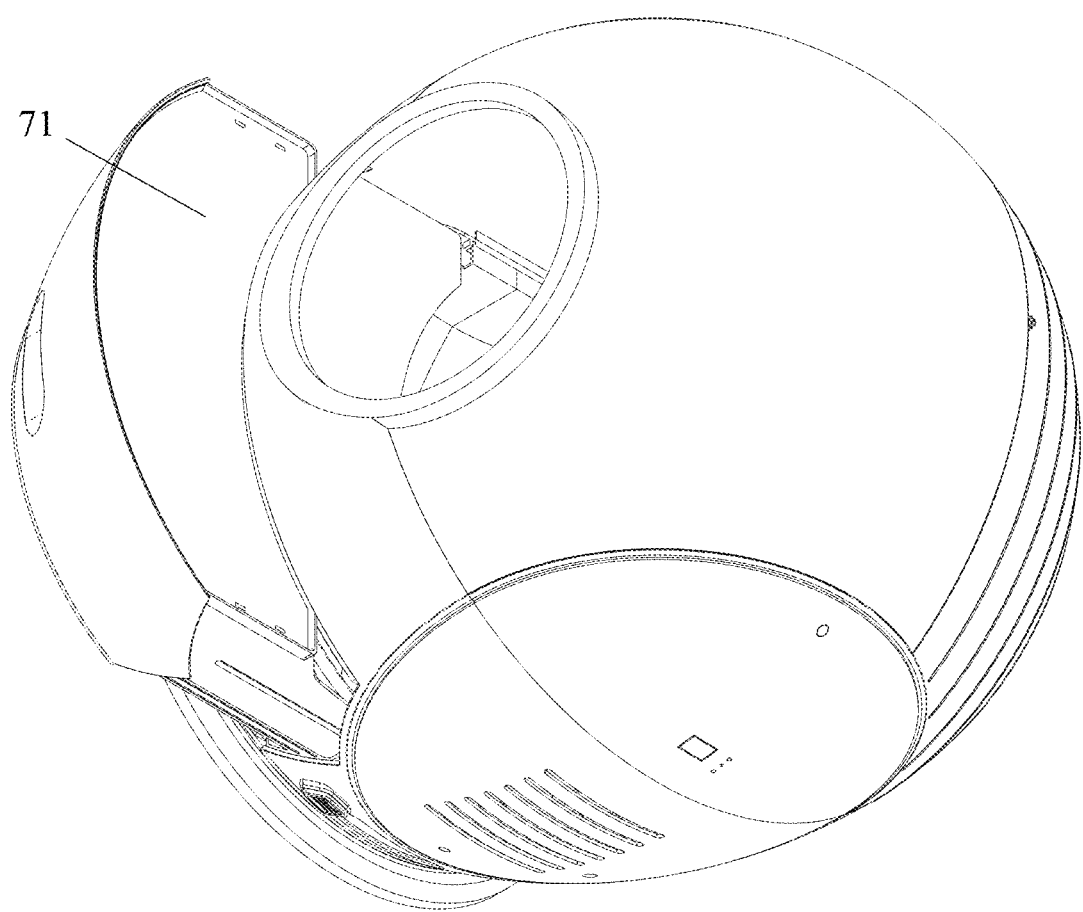
FIG. 1 is a perspective view of the full-automatic cat toilet of the present disclosure.
Figure 2:
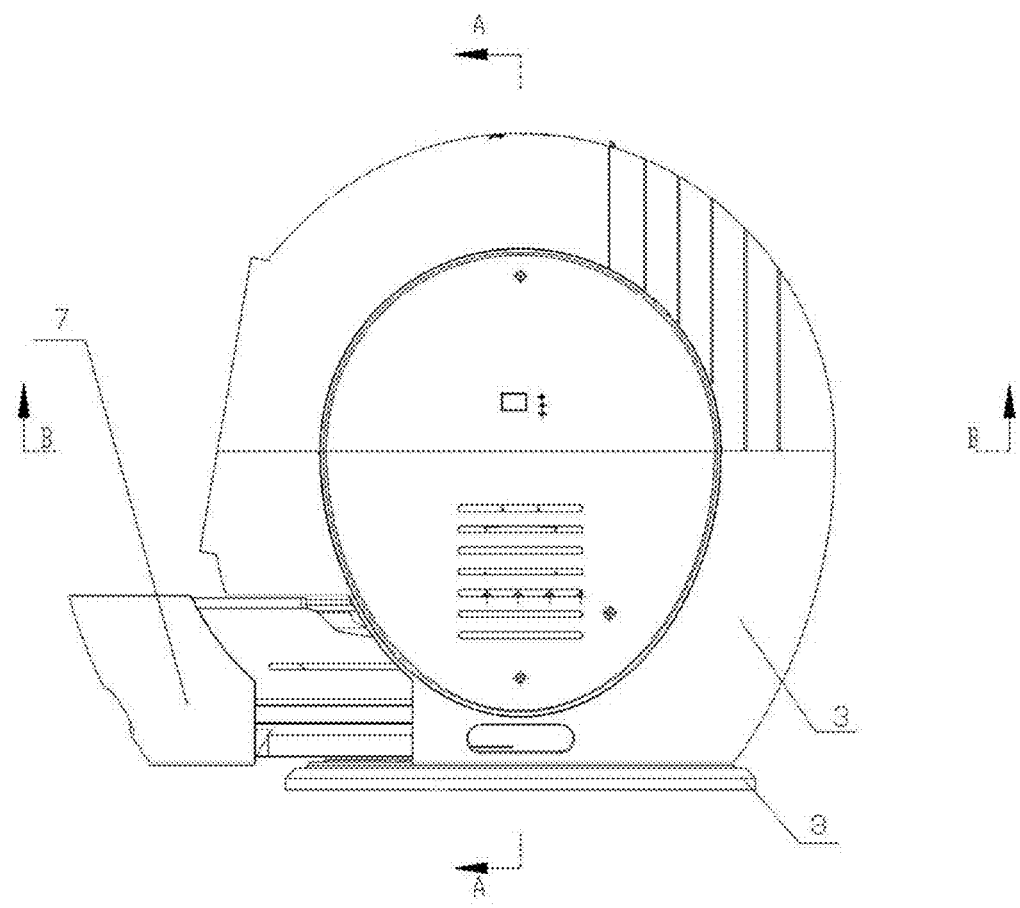
FIG. 2 is a side view of the full-automatic cat toilet of the present disclosure.
Figure 3:
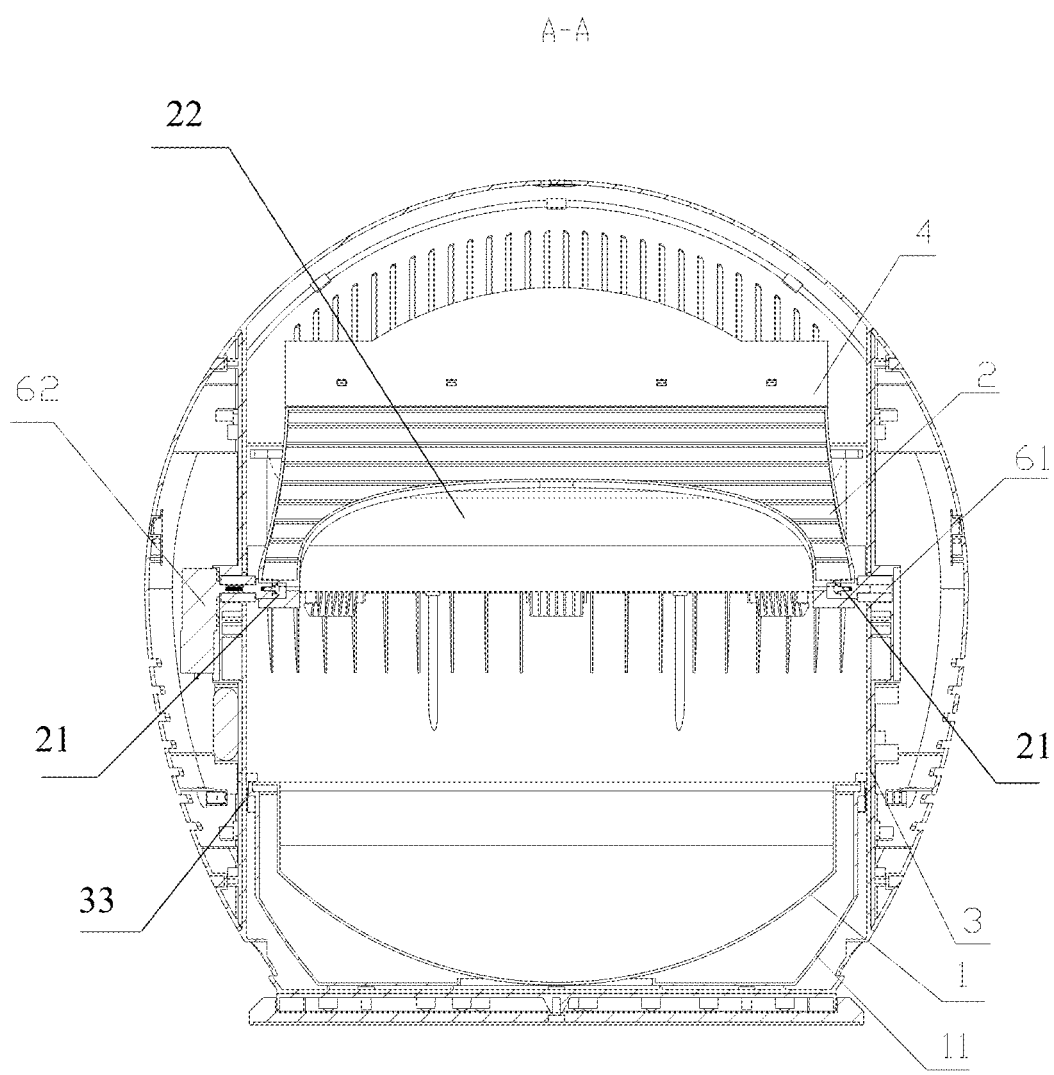
FIG. 3 is a cross-sectional view taken along the line A-A in FIG. 2.
Figure 4:
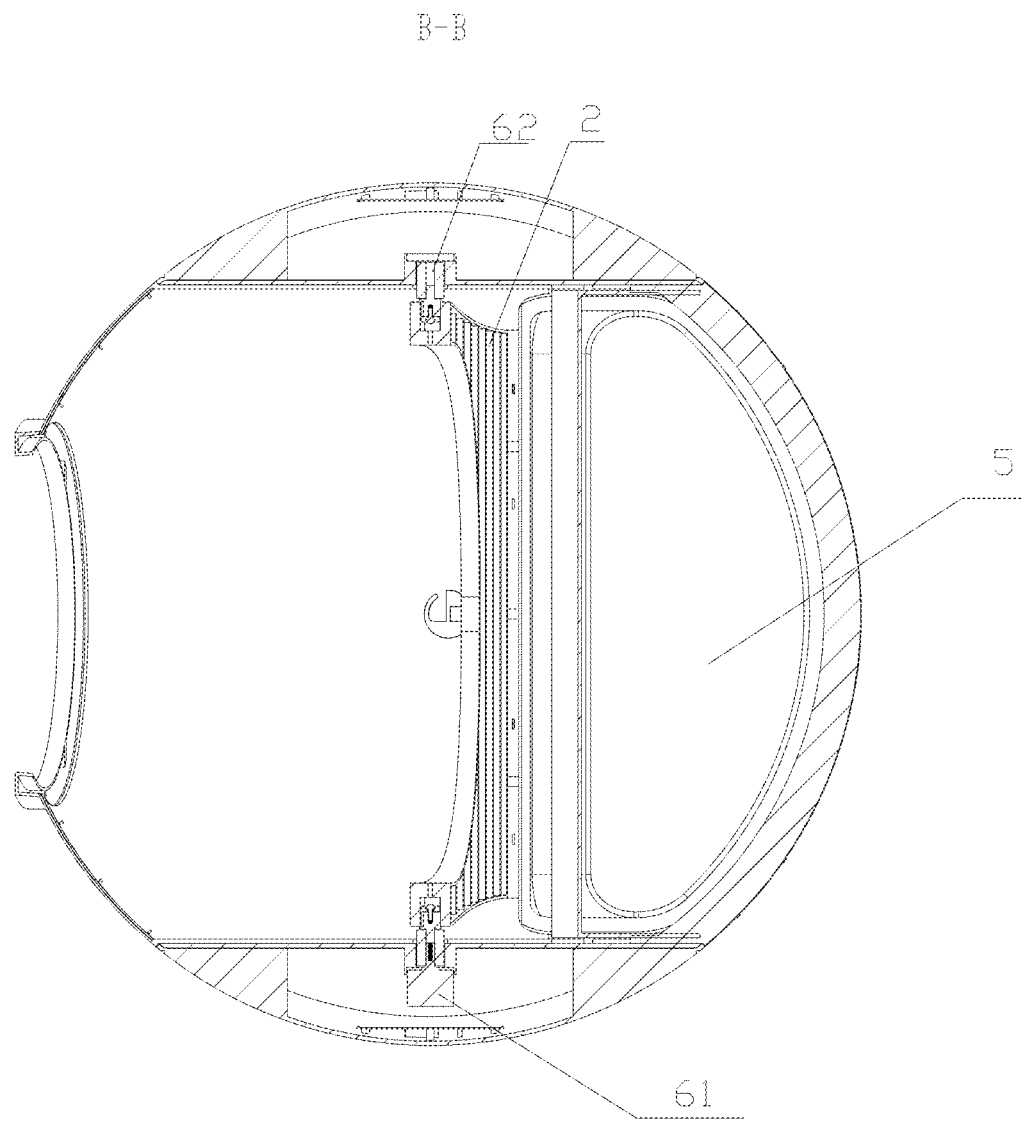
FIG. 4 is a cross-sectional view taken along the line B-B in FIG. 2.
Figure 5:
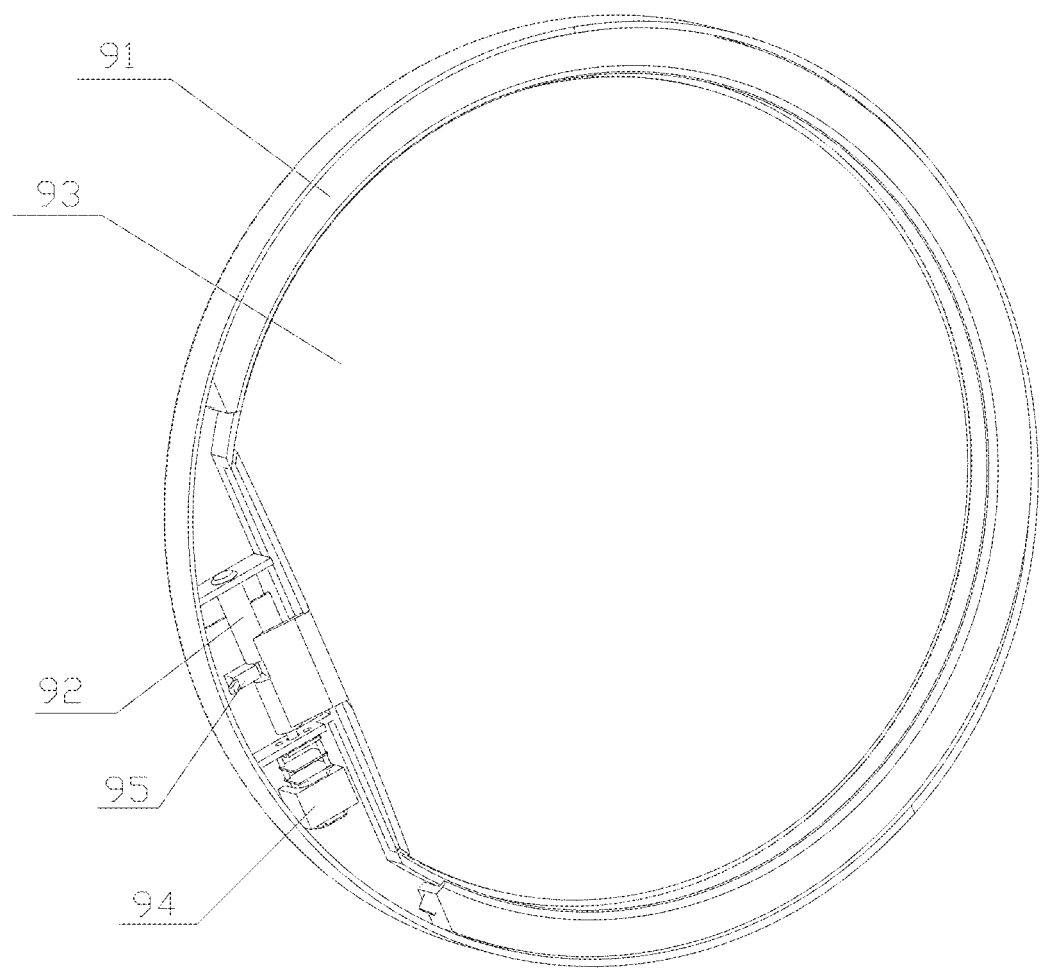
FIG. 5 is a structural schematic diagram of the door of the full-automatic cat toilet of the present disclosure.
Figure 6:
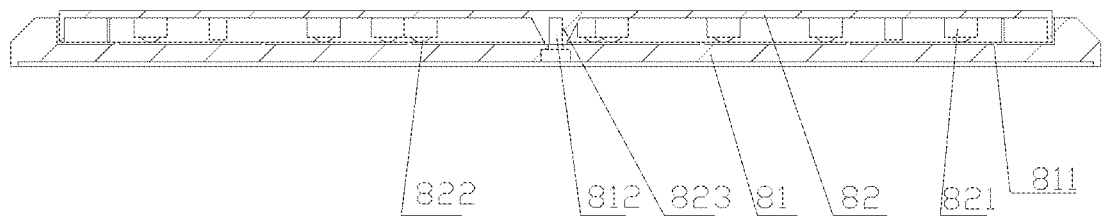
FIG. 6 is a schematic diagram of the rotating assembly of the full-automatic cat toilet of the present disclosure.
Figure 7:
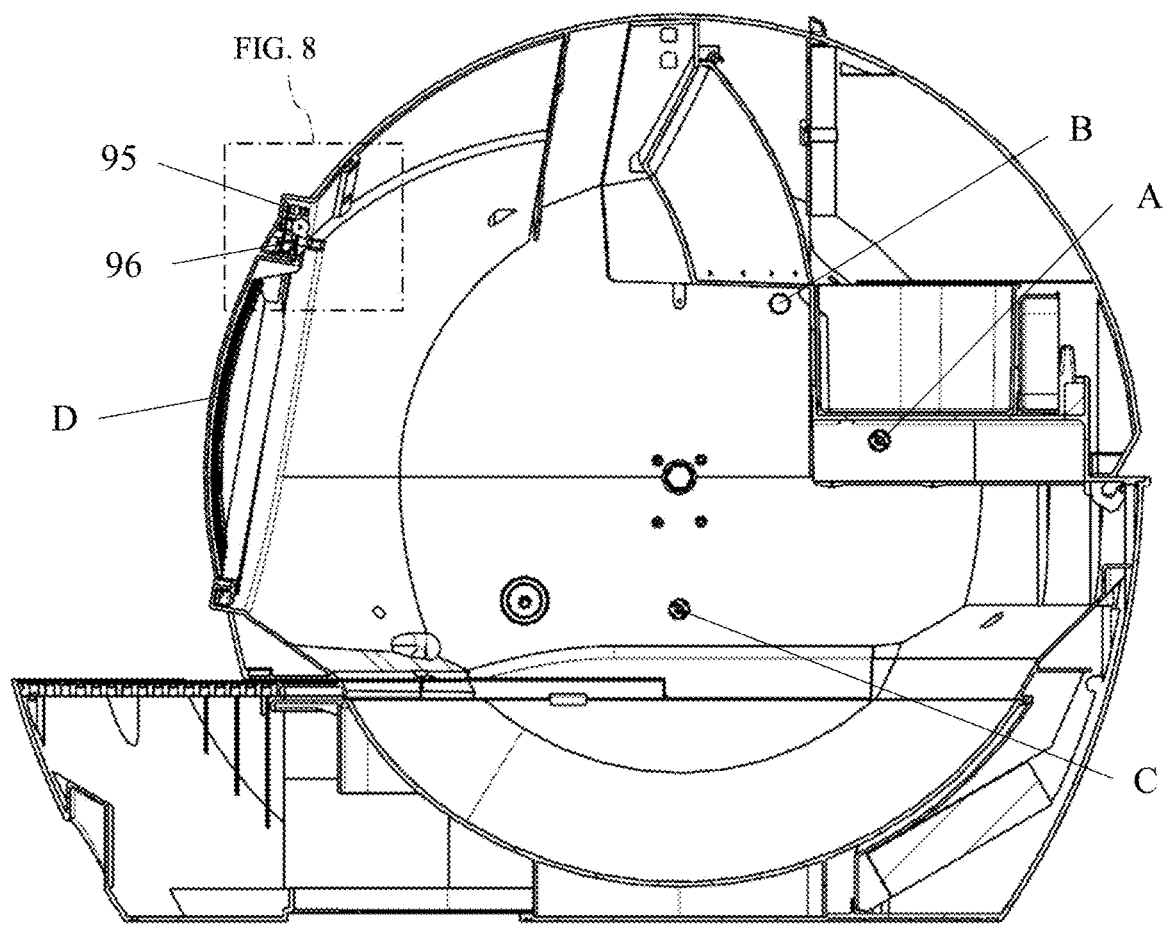
FIG. 7 is a cross-sectional view of FIG. 2.
Figure 8:
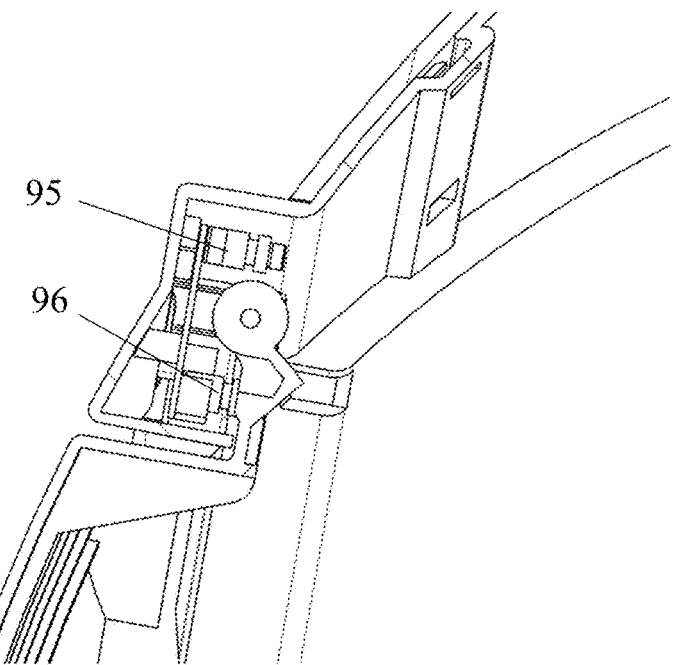
FIG. 8 is an enlarged view of a portion taken from FIG. 7.
Figure 10:
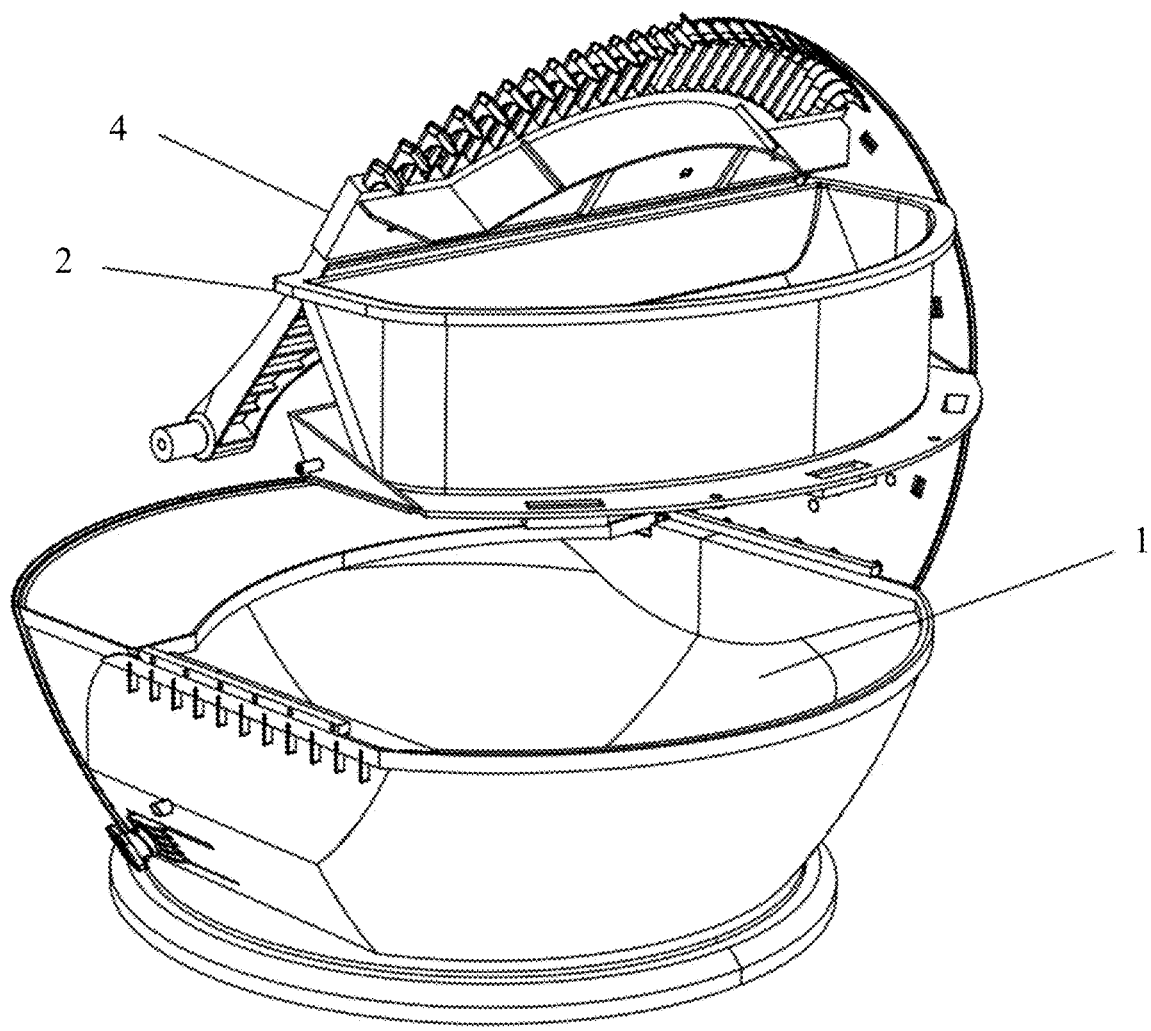
FIG. 10 is a perspective view of the full-automatic cat toilet without the housing.

As shown in FIGS. 1-8, the full-automatic cat toilet includes:
an accommodating cavity 1 arranged in the base for placing cat litter;
a rotating shovel 2; wherein two ends 21 of the rotating shovel 2 are rotatably arranged in a base 3; a rotating shovel claw 4 is arranged at a radial end of the rotating shovel 2; the rotating shovel 2 and the rotating shovel claw 4 are capable of turning over with respect to the accommodating cavity 1 and the base 3; please refer to FIG. 7, a turning movement stroke of the rotating shovel 2 and rotating shovel claw 4 is between position A (initial point) and position B (terminal point); wherein the position A is located in a rear bottom area of the base 3 and tilted downwards, and the position B is located in a rear top area of the base 3 and tilted downwards;

Please refer to FIG. 10, the accommodating cavity 1 is located below the rotating shovel 2 and the rotating shovel claw 4; and the accommodating cavity 1 has a space that satisfies the turning movement stroke of the rotating shovel 2 and the rotating shovel claw 4; through a turning movement of the rotating shovel 2 and the rotating shovel claw 4, a collection and removal of cat litter blocks in the accommodating cavity 1 are realized.

The full-automatic cat toilet further includes a removable rubbish box 5 configured to receive the cat litter blocks in the rotating shovel claw 4, when the rotating shovel 2 and the rotating shovel claw 4 reaches the position B, the cat litter blocks collected by the rotating shovel claw 4 enter the rubbish box 5.

The full-automatic cat toilet further includes a rubbish box base configured to place the rubbish box; the removable rubbish box is provided with a rubbish box cover.

The full-automatic cat toilet further includes a rotating shovel driving component; wherein the rotating shovel driving component comprises a first motor 61 installed on the base 3; the first motor 61 is connected to an end of the rotating shovel 2, and the first motor 61 is a positive and negative rotating motor. The first motor 61 communicates with a controller.

The rotating shovel driving component further includes a second motor 62 installed on the base 3; the first and second motors 61, 62 are symmetrically arranged on the base 3, and the second motor 62 is drivingly connected to the other end of the rotating shovel 2; the second motor is a positive and negative rotating motor, and the second motor rotate 62 communicates with the controller.

The base 3 is provided with a cover; the base and the cover form a cat toilet housing; the cat toilet housing is provided with a door hole, and a door frame 91 is arranged in the door hole; the door frame 91 is connected to a door 93 through a pivot 92, and a door motor 94 is drivingly connected to the pivot 92; two sides of the pivot 92 are respectively provided with a first limit switch 95 and a second limit switch 96; when the door 93 rotates to the first limit switch 95, the door 93 is opened to a maximum angle; when the door 93 rotates to the second limit switch 96, the door 93 is closed.

The accommodating cavity 1 is installed on the base 3 through a accommodating cavity base 11, and the accommodating cavity base 11 limits the accommodating cavity to moving left and right;

A side wall of the base 3 is provided with a long groove, and a bar 33 is arranged in the long groove. The bar presses the accommodating cavity 1 and the accommodating cavity base 11, and the bar limits the accommodating cavity to moving up and down.

The base 3 is provided with a sliding base 7; the sliding base 7 is capable of moving horizontally with respect to the base 3, the sliding base 7 is capable of being hidden in the base 3 or being slid out of the base 3; the sliding base 7 is provided with a pedal 71; a fastening mechanism 31 is provided on the base 3, and the fastening mechanism 31 is configured to control the sliding base 7 to pull out and pull back.

A bottom of the cat toilet is provided with a rotating assembly 8.

The rotating shovel 2 is provided with a notch 22 on a side close to a center axis of the rotating shovel, and the notch 22 is used to provide space for a cat; the rotating shovel claw 4 is detachably installed on the rotating shovel 2; the rotating shovel claw 4 comprises at least one collection claw radially arranged; an end of the at least one collection claw is a V-shaped structure; the at least one collection claw is driven to turn over by the rotating shovel, and the at least one collection claw is matched with an inner wall of the accommodating cavity.

The base 3 is provided with an upper front cover and an upper rear cover; the upper front cover and the base 3 are provided with a correspondingly notch, and the corresponding notch on the upper front cover and the base form an entrance of the cat toilet.

The cat toilet further includes:
- a first photoelectric sensor switch group configured to judge whether there is a cat in the accommodating cavity;
- a second photoelectric sensor switch group configured to judge whether the rotating shovel and the rotating shovel claw have reached the position A;
- a third photoelectric sensor switch group configured to judge whether the rotating shovel and the rotating shovel claw have reached the position B;
- a clock configured to judge whether it is non-working time at night;
- ultraviolet lamp beads configured to sterilize the cat toilet;
- a atmosphere lamp assembly configured to display a working status of the cat toilet; wherein when the rotating shovel and the rotating shovel claw are working, the atmosphere lamp assembly displays a first color; when the door is opened or closed, the atmosphere lamp assembly displays a second color; when the ultraviolet lamp beads are working, the atmosphere lamp assembly displays a third color;
- a first timer configured to obtain a residence time T1 that the cat stays in the accommodating cavity;
- a second timer configured to obtain a time that there is no cat in the accommodating cavity, that is, a leaving time $T_2$;
- a third timer configured to obtain a working time of the atmosphere lamp assembly; and
- a fourth timer configured to obtain a running time of the ultraviolet lamp beads;
- wherein the first photoelectric sensor switch group, the second photoelectric sensor switch group, the third photoelectric sensor switch group, the first timer, the second timer, the third timer, the fourth timer, the clock, the ultraviolet lamp beads, the atmosphere lamp assembly, and the rotating shovel drive component communicate with a controller respectively.

Embodiment 1

Each side in the cat toilet at a height of 12 cm from a bottom of the base is provided with the first photoelectric sensor switch. When the first photoelectric sensor switches are shielded, it is judged that a cat has entered the cat toilet. The cat is judged to have entered the cat toilet only if the first photoelectric sensor switches are shielded for more than 60 seconds, because the first photoelectric sensor switches will be temporarily shielded by the rotating shovel during the turning process.

On one side of the rotating shovel, the second photoelectric sensor switch and the third photoelectric sensor switch are arranged at start and end positions of a turning movement to judge the start and end of the turning movement.

The rotating shovel is provided with a rotating shovel body and a rotating shovel claw, the rotating shovel claw can be detached for cleaning.

The atmosphere lamp assembly is arranged at the entrance of the cat toilet.

The cat toilet is provided with the base, the sliding base and the accommodating cavity. The sliding base can slide straight with a stroke of 15 cm on the base. The base is provided with a steel ball groove, and the sliding base is provided with a steel ball contact rib for pulling out and pulling back the sliding base. The accommodating cavity can be a litter box, which is placed on a litter box base, and the litter box base restricts the horizontal movement of the litter box; and the litter box can be lifted up for cleaning. A bottom shape of the litter box fits a curved surface formed by the rotating shovel, and is offset by 10 mm.

The pedal is placed on the sliding base. When the sliding base is pulled out, the pedal can be used by the cat to step on to enter the cat toilet, and the pedal can be disassembled for cleaning. A carpet is provided on the pedal, the carpet can be disassembled for cleaning. A protruding part is provided on the pedal, and the protruding part contacts a switch (physical power-on switch of the whole machine) placed on the base after the sliding base being pulled out.

Figure 9:
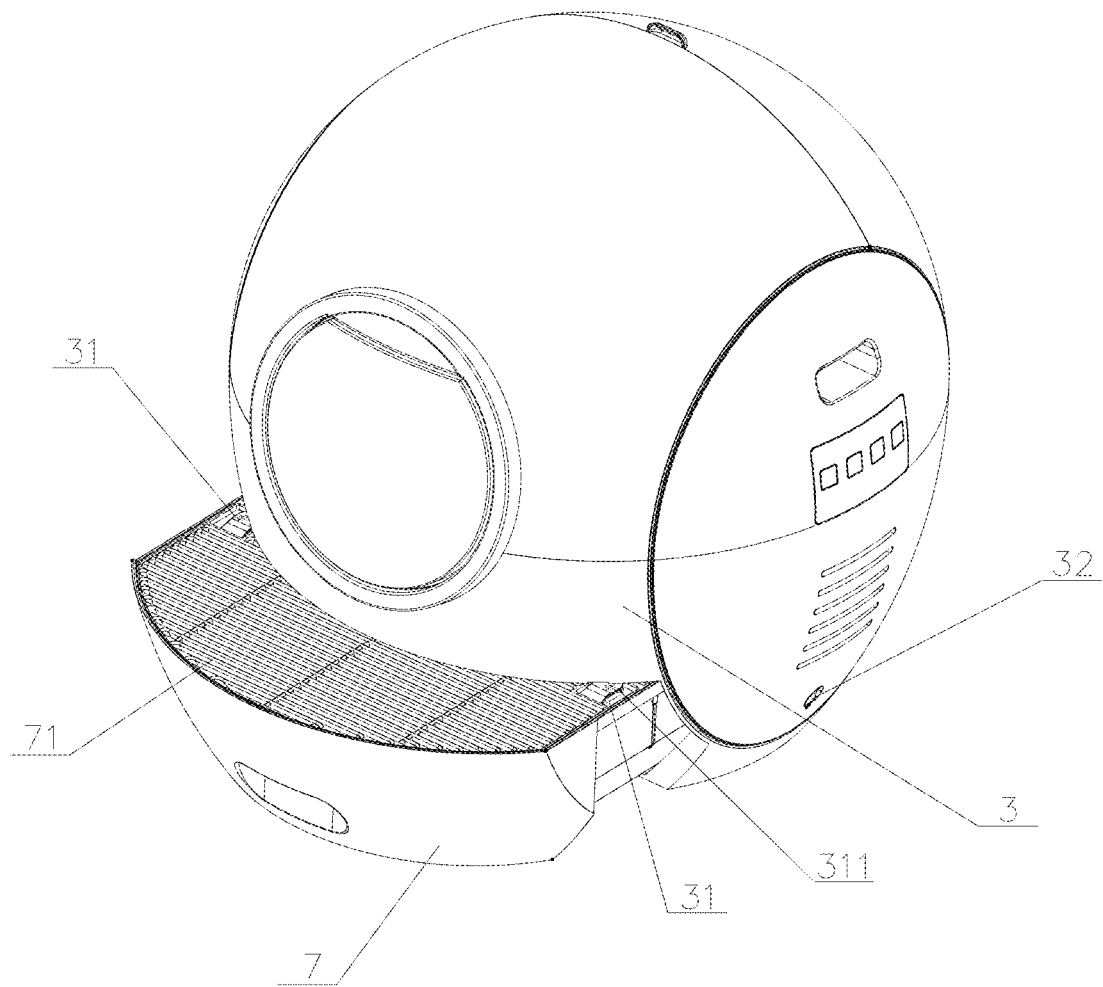
FIG. 9 is another perspective view of the full-automatic cat toilet of the present disclosure

As shown in FIG. 9, the base and the cat litter base are provided with a fastening mechanism 31, and a bottom of a side of the body base is provided with a button 32. After the button 32 is pressed, the sliding base can be pulled out of the base. The fastening mechanism 31 includes a fastening part 311. In the present embodiment, the fastening mechanism 31 is arranged on an upper surface of the pedal 71. There are two fastening mechanisms 31 which are symmetrically distributed on inside edges of the pedal 71. The fastening part 311 is located at a top of the fastening mechanism 31. The fastening part 311 is able to be deformed and restored to its original state. When the fastening parts 311 of the fastening mechanisms 31 on two sides are pressed down, the sliding base can be pulled out of the base; after use, the sliding base is pushed back into the base and locked by the fastening mechanism 31 to prevent the sliding base from moving out by itself. The fastening mechanism may be a vertical stop block arranged on an inner wall of the base, and at least one horizontally arranged convex bar is arranged on two side walls of the sliding base. When the convex bar is located behind the stop block, the sliding base can't be pulled out due to the stop block. The button is arranged on the base. When the button is pressed, the button acts on the convex bar. The convex bar is recessed inward, and the convex bar is located inside the stop block. At this time, the sliding base can be pulled out from the base smoothly. The fastening mechanism 31 can also adopt other structures, so that the sliding base can be installed on the base in a retractable manner.

Side plates are provided on both sides of the base, the side plates are configured to install motors, battery, and main circuit parts of the main board light. Side covers are arranged outside the side plates to cover the circuit parts on both sides. A display window and a charging interface are provided on the side covers.

A rotating assembly is provided under the cat toilet base. The rotating assembly 8 includes a bottom plate 81 and a rotating upper plate 82. The rotating upper plate 82 can rotate relative to the bottom plate 81.

A plurality of circumferentially arranged rails 811 are provided on the bottom plate 81, and the plurality of rails 811 are arranged concentrically, and diameters of the plurality of rails 811 are different and the plurality of rails 811 are arranged in sequence from the inside to the outside. A central shaft 812 is provided in a center of the bottom plate 81.

Several steel ball rings are arranged at a bottom of the rotating upper plate 82, and the steel ball rings are circumferentially arranged, and the steel ball rings are matched with corresponding rails. The steel ball ring includes at least one steel ball groove 821. The steel ball groove 821 is evenly arranged in a circumferential direction, and the steel ball groove 821 is arranged axially. The steel balls 822 are placed in the steel ball groove 821 through grease, and the steel balls 822 roll on the corresponding rails 811. An axial groove 823 is provided in a center of a bottom surface of the rotating upper plate 82.

The central shaft 812 of the bottom plate 81 is arranged in the axial groove 823 of the rotating upper plate 82.

The rotating assembly 8 may adopt other structures as long as the cat toilet can rotate.

The upper front cover is fixedly arranged on a front part of the cat toilet base for covering the front part of the cat toilet. The rubbish box base is fixedly arranged on a rear part of the cat toilet base for placing the rubbish box and partly covering the rear part of the cat toilet. The cover can also be designed as a left-right structure.

A drawable rubbish box is placed on the cat toilet base, and the rubbish box is used to collect cat litter blocks. A rubbish box cover is also placed on cat toilet base to cover the upper rear space. Magnets are also arranged on the rubbish box cover for closely connecting the upper cover.

The rotating shovel stays at position A in a standby state. After a period from the time the cat leaves to the designated time, for example, 10 minutes, the rotating shovel starts to rotate for 220 degrees, dumping the cat litter blocks into the rubbish box.

The present disclosure can adopt both automatic operation mode and manual operation mode. The difference between the automatic operation mode and the manual operation mode is that the start conditions of the rotating shovel and rotating shovel components are different. In the automatic operation mode, the start condition of the rotating shovel and rotating shovel components is: when the cat enters the cat toilet, the first photoelectric sensor switch group detects that the cat is inside the accommodating cavity, the first timer starts to record the time; and if the cat stays for more than 60 seconds, it is confirmed that the cat is using the cat toilet; when the first photoelectric sensor switch group detects that the cat has left, the second timer records the leaving time; if the leaving time reaches 10 minutes, the rotating shovel and the rotating shovel claw automatically starts to run the cleaning function. The starting condition of the manual operation mode is: as long as the cat is not in the accommodating cavity, the rotating shovel drive motor can be started to operate the rotating shovel and the rotating shovel claw.

When starting to use, the pedal of the sliding base is pulled to a position, the pedal contacts the on-off sensor switch, the controller detects that the on-off sensor switch is closed, the atmosphere lamp is started to show blue color. When the pedal of the sliding base is not pulled to the position or the on-off sensor switch is not closed, the automatic operation mode and manual operation mode cannot be started.

Automatic Operation Mode:

The second photoelectric sensor switch group A detects whether the rotating shovel and the rotating shovel claw are at the origin, that is, position A. If not, the rotating shovel drive DC motor (reverse rotation) is started to drive the rotating shovel and the rotating shovel claw to return to the origin position, and at the same time, the atmosphere lamp turns green and flashes slowly. After returning to the origin (the second photoelectric sensor switch group A), the safety door (that is, the door) DC drive motor is started to rotate in a positive direction; the atmosphere lamp flashes blue quickly, the safety door opens to the maximum position (position C), and a signal of the first limit switch is detected, the door drive motor stops working, and the atmosphere lamp is always on in blue.

The automatic operation state is stopped, and the safety door DC drive motor rotates in a reverse direction to drive the safety door to the closed position (position D). A signal of the second limit switch is detected, the safety door DC drive motor stops, and the atmosphere lamp flashes blue quickly during operation. All atmosphere lamps are turned off after the safety door DC drive motor is stopped.

In the automatic operation state, when the cat enters the cat toilet, the first photoelectric sensor switch group detects that the cat is inside the accommodating cavity, the first timer starts to record the time; and if the cat stays for more than 60 seconds, it is confirmed that the cat is using the cat toilet; when the first photoelectric sensor switch group detects that the cat has left, the second timer records the leaving time; if the leaving time reaches 10 minutes, the rotating shovel and the rotating shovel claw automatically starts to operate the cleaning function.

Automatic operation of the cleaning function; the safety door DC drive motor rotates in a reverse direction to drive the safety door to the closed position (position D). The signal of the second limit switch is detected, the safety door DC drive motor stops, the rotating shovel decelerating motor controls the rotating shovel to rotate forward, the atmosphere lamp flashes green slowly; and when it reaches position B, the third photoelectric sensor switch group B (photoelectric correlation induction) detects the signal, and the rotating shovel decelerating motor stops immediately. After a delay of 2 seconds, the rotating shovel decelerating motor rotates in a reverse direction to drive the rotating shovel to return. The green lamp flashes slowly, and rotating shovel returns to the original point, that is position A. The second photoelectric sensor switch group A (photoelectric correlation induction) detects the signal, the rotating shovel decelerating motor completely stops, after the cleaning action is completed, the safety door DC drive motor is started to rotate in forward direction, the safety door opens to position C, and when the signal of the first limit switch is detected, the safety door stops, the atmosphere lamp turns blue.

During the operation of the rotating shovel, the safety door was opened by the cat to a position away from the closed position (position D), the atmosphere lamp turns red, the rotating shovel operation is then suspended, the safety door DC drive motor rotates in a reverse direction, the safety door rotates to the closed position (position D), and the signal of the second limit switch is detected, the rotating shovel is kept on running, and the atmosphere lamp turns green.

Manual Operation Mode:

The safety door DC drive motor rotates in a reverse direction, the safety door rotates to the closed position (position D). The signal of the second limit switch is detected, the safety door DC drive motor stops, the rotating shovel decelerating motor controls the rotating shovel to rotate forward, and the rotating shovel stops when it reaches the position B, and the rotating shovel decelerating motor rotates in a reverse direction to drive the rotating shovel to return to the position A, the atmosphere lamp flashes green slowly during operation. After the process is completed, the safety door is opened to position C, and the atmosphere lamp turns blue.

In the manual operation process, if the rotating shovel does not run to the origin position A, it will automatically return to the origin position A after a delay of 20 minutes, and then it is switched to the automatic operation state.

The second limit switch first detects that the safety door is in the closed state (position D), and then the rotating shovel decelerating motor starts to drive the rotating shovel move to the position (position B), then the rotating shovel decelerating motor starts to drive the rotating shovel move back to the origin position A. The atmosphere lamp flashes green slowly.

After the automatic cleaning of the cat toilet is completed, the ultraviolet lamp beads are turned on for 20 minutes for disinfecting. During the disinfection process, the atmosphere lamp turns red and flashes slowly. If the first photoelectric sensor switch group detects that the cat enters the cat toilet during the disinfection process, the ultraviolet lamp beads are turned off.

The sleep time is set from 10 o'clock PM to 6 o'clock AM through the clock. In the automatic operation mode, the cat toilet will stop running during the sleep time, all the atmosphere lamps will be turned off. The cat toilet will automatically return to the running state during the day time. The night time period is set as sleep time, and the cat toilet stops responding during this period.

The power supply voltage of cat toilet is mainly DC low voltage of 12V.

The entrance and interior of the cat toilet are provided with photoelectric sensors (the photoelectric sensor is in through-beam state) to detect the cat entering and exiting process.

The rotating shovel decelerating motors are connected in parallel on both sides (the motor voltage is DC 12V), and one detecting photoelectric sensor is used for detecting positive rotation, another photoelectric sensor is used for detecting negative rotation (Forward limit position is detected at a through-beam state position of the photoelectric sensor, and returns to the original position signal).

A sensor switch is arranged at a pedal position. The position limit switch at the safety door adopts 2 sensor switches. The sensor switches arranged at the safety door and the pedal adopt common limit switches.

The clock display may adopt 0.56 inches digital tube, the clock may adopt a battery structure or the plug-in structure. The clock adopts the battery structure, which can avoid an incorrect time of the clock when the power is turned on again after the power is cut off.

The first, second, and third photoelectric sensor switch groups may adopt an infrared emitting tube and an infrared receiving tube structure, that is, the through-beam state is used to determine whether the photoelectric sensor switch is shielded. When the infrared transmitting tube and the infrared receiving tube is shielded, it is judged that the cat enters the cat toilet; otherwise, it does not enter. When the infrared emitting tube and the infrared receiving tube is shielded by the rotating shovel, it is judged that the rotating shovel has reached position A or position B, otherwise, it has not reached the designated position.

The collection device and the removal device of cat litter blocks are combined to form an integrated structure, which is designed as a rotating shovel and a rotating shovel claw. The cat litter can be collected and dumped into the rubbish box through the rotating shovel, that is, two functions can be realized by one turning action. The cat toilet is clever and easy to use.

By combining the collection device and the removal device of cat litter blocks into an integrated structure, the present disclosure has fewer parts and a more compact structure; in addition, the height space of the cat toilet is fully utilized by the turning motion, so that the length of the cat toilet is greatly reduced, and the footprint of the cat toilet is greatly reduced.

The present disclosure is provided with a retractable sliding seat. When the sliding seat is pulled out, the sliding seat triggers the physical switch of the cat toilet, so that the cat toilet changes from a standby state to a working state; in addition, when the sliding seat is pulled out, a step is formed, which is convenient for the cat entering the accommodating cavity. A fastening mechanism is set between the sliding seat and the base of the cat toilet. When the fastening mechanism is pressed down, the sliding seat can be pulled out from the base; when it is used, the sliding seat is pushed back to the base and is locked through the fastening mechanism to prevent the sliding seat from moving out by itself.

The accommodating cavity of the present disclosure is located in the cat toilet, and its horizontal and vertical directions are respectively realized by corresponding limiting devices. The limiting structure in the horizontal direction can be realized by the accommodating cavity base. The accommodating cavity base matches with the accommodating cavity. The edge of the accommodating cavity is overlapped on the edge of the accommodating cavity base. A gap is left between the outer wall of the accommodating cavity and the outer wall of the accommodating cavity base. The horizontal movement of the accommodating cavity is restricted by the accommodating cavity base. Optionally, the bottom of the accommodating cavity base can be designed as a horizontal structure to ensure that the accommodating cavity base is stably placed on the cat toilet base. Optionally, an annular limit cylinder can also be arranged on the inner wall of the cat toilet base. The upper part of the annular limit cylinder is provided with an edge, the edge of the accommodating cavity overlaps the edge of the annular limit cylinder. The annular limit cylinder is slightly larger than the accommodating cavity and can limit the accommodating cavity to moving in horizontal direction. Optionally, it is also possible to provide a convex ring on the base. The convex ring is arranged horizontally, and the edge of the accommodating cavity is directly overlapped on the convex ring. The horizontal limit structures are not limited to the above structures. As long as the horizontal direction movement of the accommodating cavity can be limited by other structures, the other structures are all within the scope of the limit structure of the present disclosure.

The vertical limit of the accommodating cavity of the present disclosure can be achieved by arranging limit bars on the base, for example, a long groove is provided on the base, and a bar is arranged in the long groove. The bar is located above the edge of the accommodating cavity. The vertical limit structure is not limited to the above-mentioned structure, as long as the structures capable of realizing the upper and lower limit of the accommodating cavity are within the scope of the limit structure of the present disclosure.

The movement of the rotating shovel of the present disclosure can be realized by a manual rotating structure. For example, one end of the rotating shovel is provided with a rotating handle, the other end of the rotating shovel is rotatably arranged on the side wall of the base, and the center axis of the rotating shovel is set horizontally. Optionally, both ends of the rotating shovel can be provided with rotating handles. The rotating handle can realize the turning of the rotating shovel, and realize the collection and removal of cat litter blocks.

The rotating shovel of the present disclosure can also be driven by a motor, and motors can be installed on one or both sides of the base, and the rotating shovel and the rotating shovel claw can be driven by the motor.

The housing formed by the base and the cover of the present disclosure can be a left and right separate structure, or a upper and lower separate structure. When the housing has an upper and lower separate structure, it includes a lower housing and an upper housing. The base may be a left and right separate structure or a front and rear separate structure. The upper housing may include a left and right cover structure, or a front and rear cover structure. When the housing is a left and right separate structure, it includes a left housing and a right housing. The left housing includes a left upper cover and a left base; and the right housing includes a right upper cover and a right base.

What is claimed is:

1. A full-automatic cat toilet, comprising:
a base;
an accommodating cavity arranged in the base for placing cat litter; and
a rotating shovel; wherein
the rotating shovel has two ends rotatably arranged in the base, and a rotating shovel claw arranged at a radial end thereof; the rotating shovel and the rotating shovel claw are capable of turning over with respect to the accommodating cavity and the base; a turning movement stroke of the rotating shovel and rotating shovel claw is between position A and position B; wherein the position A is located in a rear bottom area of the base, and the position B is located in a rear top area of the base;
the accommodating cavity is located below the rotating shovel and the rotating shovel claw, and the accommodating cavity has a space that accommodates the turning movement stroke of the rotating shovel and the rotating shovel claw;
the cat toilet further comprises a removable rubbish box configured to receive the cat litter blocks in the rotating shovel claw, when the rotating shovel and the rotating shovel claw reaches the position B, the cat litter blocks collected by the rotating shovel claw enter the rubbish box; and
the rotating shovel is provided with a notch on a side close to a center axis of the rotating shovel; at least one rotating shovel claw is detachably installed on the rotating shovel; the rotating shovel claw comprises at least one collection claw radially arranged thereon, the at least one collection claw has a V-shaped end and is driven to turn over by the rotating shovel, and the at least one collection claw fits an inner wall of the accommodating cavity.

2. The full-automatic cat toilet of claim 1, further comprising a rotating shovel driving component; wherein the rotating shovel driving component comprises a first motor installed on the base, which is a positive and negative rotating motor and drivingly connected to an end of the rotating shovel.

3. The full-automatic cat toilet of claim 1, further comprising a rotating shovel driving component; wherein the rotating shovel driving component comprises a first motor and a second motor; the first and second motors are symmetrically arranged on the base and drivingly connected to both ends of the rotating shovel separately; the first and second motors are both positive and negative rotating motors, and the second motor rotates synchronously with the first motor.

4. The full-automatic cat toilet of claim 1, wherein the base is provided with a cover; the base and the cover form a cat toilet housing which is provided with a door hole, and a door frame is arranged in the door hole and connected to a door through a pivot, and a door motor is drivingly connected to the pivot;
both sides of the pivot are respectively provided with a first limit switch and a second limit switch; when the door rotates to the first limit switch, the door is opened to a maximum angle; when the door rotates to the second limit switch, the door is closed.

5. The full-automatic cat toilet of claim 1, wherein a sliding base and a fastening mechanism are provided on the sliding base, and the fastening mechanism is configured to control the sliding base to pull out and pull back.

6. The full-automatic cat toilet of claim 5, wherein the sliding base is a drawer-type structure, which is capable of moving horizontally with respect to the base, the sliding base is capable of being hidden in the base or being slid out of the base; a top surface of the sliding base is provided with a pedal, and the pedal is set horizontally.

7. The full-automatic cat toilet of claim 4, wherein a sliding base is provided on the base; the sliding base is a drawer-type structure, the sliding base can move horizontally with respect to the base, the sliding base is capable of being hidden in the base or being slid out of the base; a top surface of the sliding base is provided with a pedal, and the pedal is set horizontally; the sliding base is provided with a fastening mechanism configured to control the sliding base to pull out and pull back.

\* \* \* \* \*